United States Patent [19]

Honda et al.

[11] 4,340,110

[45] Jul. 20, 1982

[54] APPARATUS FOR CONNECTING TUNDISH AND MOLD FOR HORIZONTAL CONTINUOUS CASTING OF METAL

[75] Inventors: Akira Honda, Kamakura; Masaru Ishikawa, Fukuyama; Seishi Mizuoka, Fukuyama; Katsunori Ono, Fukuyama, all of Japan

[73] Assignee: Nippon Kokan Kabushiki Kaisha, Tokyo, Japan

[21] Appl. No.: 160,595

[22] Filed: Jun. 18, 1980

[30] Foreign Application Priority Data

Jul. 10, 1979 [JP] Japan .................................. 54-86497

[51] Int. Cl.³ .............................................. B22D 11/00
[52] U.S. Cl. ..................................... 164/435; 164/440
[58] Field of Search ................................ 164/440, 435

[56] References Cited

U.S. PATENT DOCUMENTS 3,903,955  9/1975  Antoine et al. ...................... 164/440

Primary Examiner—Robert D. Baldwin
Attorney, Agent, or Firm—Frishauf, Holtz, Goodman and Woodward

[57] ABSTRACT

An apparatus for connecting a tundish and a mold for horizontal continuous casting of a metal, which comprises: a break ring fitted to the inlet opening of a water-cooled mold through a joint material; a front nozzle engaged in the molten metal outlet of the side wall of a tundish; a feed nozzle provided between said break ring and said front nozzle so that one end thereof is in contact with said break ring and the other end thereof is in contact with said front nozzle through respective joint materials; and, a connecting mechanism for connecting said tundish and said water-cooled mold, said connecting mechanism having an elasticity means which pushes said break ring elastically against the inlet opening of said water-cooled mold, one end of said feed nozzle against said break ring, and the other end of said feed nozzle against said front nozzle.

3 Claims, 3 Drawing Figures

APPARATUS FOR CONNECTING TUNDISH AND MOLD FOR HORIZONTAL CONTINUOUS CASTING OF METAL

FIELD OF THE INVENTION

The present invention relates to an apparatus for connecting a tundish and a mold for horizontal continuous casting of a metal, which prevents leakage of a molten metal such as molten steel.

BACKGROUND OF THE INVENTION

When horizontally continuous-casting steel, for example, the usual practice for casting the steel comprises: connecting the lower part of the side wall of a tundish to a mold so that the extracting direction of a cast strand may be horizontal; teeming molten steel into the tundish from above; and, continuously extracting the molten steel in the tundish through the mold in the form of a cast strand while cooling the molten steel by the mold, thereby continuously casting the steel.

FIG. 1 is a sectional view of the connecting part between a tundish and a mold in a conventional horizontal type continuous casting machine for steel. In FIG. 1, 1 is the side wall of a tundish; and, 2 is the main body of a water-cooled mold. The tundish side wall 1 comprises a steel shell 3 and bricks (not shown), made of a refractory material, arranged inside the steel shell 3. The water-cooled main mold has a mold body 2 and a mold jacket (not shown) arranged outside the mold main body 2 for circulating cooling water for cooling the main mold body 2. The molten steel outlet of the tundish side wall 1 has the following structure: a seating ring 5 is attached to the part of the inner surface of the steel shell 3 which forms the periphery of a molten steel outlet hole 3a pierced through the steel shell 3, and a front nozzle 7 having a concave portion for receiving a feed nozzle 9 which engages with the inside of the seating ring 5 through joint material such as mortar. The seating ring 5 is fixed to the steel shell 3 by piercing a plurality of clamping bolts (not shown) fixed to the seating ring 5 through the steel sheel 3 and then tightening these bolts by respective nuts (not shown).

As shown in FIG. 1, a break ring 8 is fitted to the inlet opening of the main mold body 2 through a joint material such as mortar. One end of the feed nozzle 9 is in contact with the break ring 8 through a joint material such as mortar. The other end of the feed nozzle 9 is in contact with the front nozzle 7, through a joint material such as mortar. Thus, molten steel contained in the tundish is supplied through the front nozzle 7, the feed nozzle 9, and the break ring 8, into the main mold body 2. Although not shown in FIG. 1, the tundish side wall 1 or the inlet end of the main body 2 of the water-cooled mold is equipped with a connecting mechanism for connecting the tundish and the water-cooled mold. The connecting mechanism has such fastening means as a plurality of bolts and respective nuts for tightly connecting the tundish and the water-cooled mold.

The above-mentioned conventional connecting mechanism applied between the tundish and the water-cooled mold has the following problems. The tundish and the water-cooled mold are connected with each other only by a tightening force of a certain fixed value established by the nut of the conventional connecting mechanism. Therefore, such tightening force of a certain fixed value fits the break ring 8 to the inlet opening of the main mold body 2, causes one end of the feed nozzle 9 to come into contact with the break ring 8, causes the other end of the feed nozzle 9 to come into contact with front nozzle 7, and causes the front nozzle 7 to engage with the seating ring 5. Accordingly, the feed nozzle 9, for example, is affected by the heat of the molten steel which is supplied from the tundish to the water-cooled mold, but the expansion of the feed nozzle 9 caused by this heat is constrained by the above-mentioned tightening force of a certain fixed value. Each of aforementioned joint materials contracts through drying and under the influence to the heat of the molten steel. Furthermore, the front nozzle 7, the break ring 8, and the feed nozzle 9 are affected by vibration caused when extracting a cast strand from the water-cooled mold. For these reasons, the joint materials provided between the break ring 8 and the main mold body 2, between the feed nozzle 9 and the break ring 8, and between the feed nozzle 9 and the front nozzle 7 are easily susceptible to cracks and tend to have a local peeloff. This results in the problem of the molten steel leaking from cracks which form in said joint materials.

SUMMARY OF THE INVENTION

An object of the present invention is therefore to provide an apparatus for connecting a tundish and a mold for horizontal continuous casting of a metal, which ensures prevention of leakage of the molten metal.

Another object of the present invention is to provide an apparatus for connecting a tundish and a mold for horizontal continuous casting of a metal, which ensures rapid and accurate connecting operations.

In accordance with one of the features of the present invention, there is provided an apparatus for connecting a tundish and a mold for horizontal continuous casting of a metal, which comprises:

a break ring fitted to the inlet opening of a mold through a joint material;

a front nozzle engaged in the molten metal outlet of the side wall of a tundish;

a feed nozzle provided between said break ring and said front nozzle so that one end thereof is in contact with said break ring and the other end thereof is in contact with said front nozzle through respective joint materials; and, a connecting means for connecting said tundish and said mold by pushing the side wall of said tundish against said mold;

said apparatus being characterized in that:

said connecting means has an elasticity means which elastically pushes said break ring against the inlet opening of said mold, one end of said feed nozzle against said break ring, and the other end of said feed nozzle against said front nozzle.

DETAILED DESCRIPTION OF PREFERRED EMBODIMENTS

We carried out extensive studies with a view to solving the above-mentioned problems involved in the conventional mechanism for connecting a tundish and a mold for horizontal continuous casting of a metal. As a result, the following finding was obtained. An elasticity means is provided in the mechanism for connecting a tundish and a mold. The elastic force of said elasticity means pushes a break ring against the inlet opening of the mold, one end of a feed nozzle against said break ring, and the other end of said feed nozzle against a front nozzle. Expansion of the feed nozzle and other parts is not therefore constrained, thus permitting absorption of contraction of such joint materials as mortar provided between the inlet opening of the mold and the break ring, between the break ring and one end of the feed nozzle, and between the other end of the feed nozzle and the front nozzle, and permitting also continuous pushing of the break ring against the inlet opening of the mold, one end of the feed nozzle against the break ring, and the other end of the feed nozzle against the front nozzle. It is thus possible to obtain an apparatus for connecting a tundish and a mold for horizontal continuous casting of a metal which prevents cracks from occurring in said joint materials and said joint materials from peeling off, and hence to ensure prevention of leakage of the molten metal.

The present invention was made on the basis of the above-mentioned finding. The apparatus for connecting a tundish and a mold for horizontal continuous casting of a metal in accordance with the present invention is described in more detail with reference to the drawings.

Figure 1:
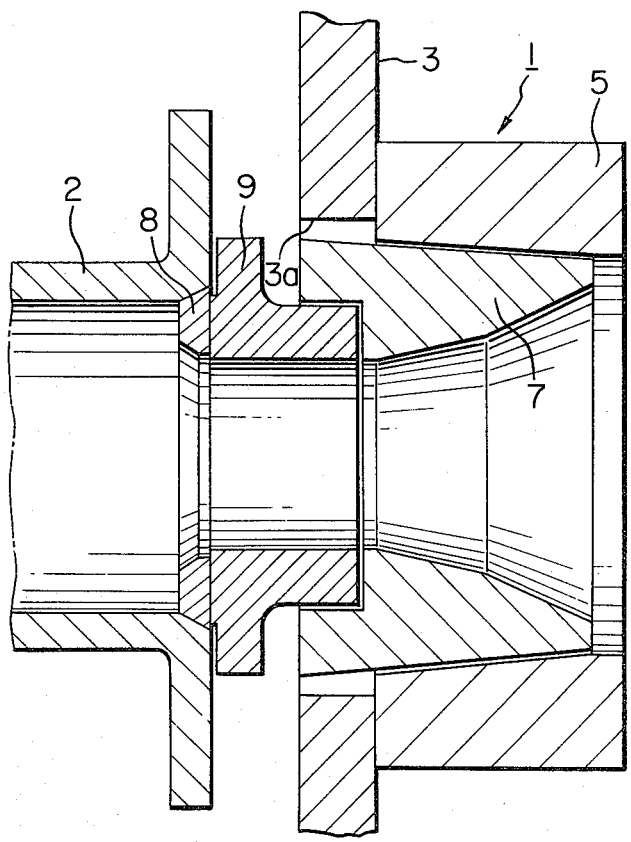
FIG. 1 is a sectional view of the connecting part between a tundish and a mold in a conventional horizontal type continuous casting machine.
Figure 2:
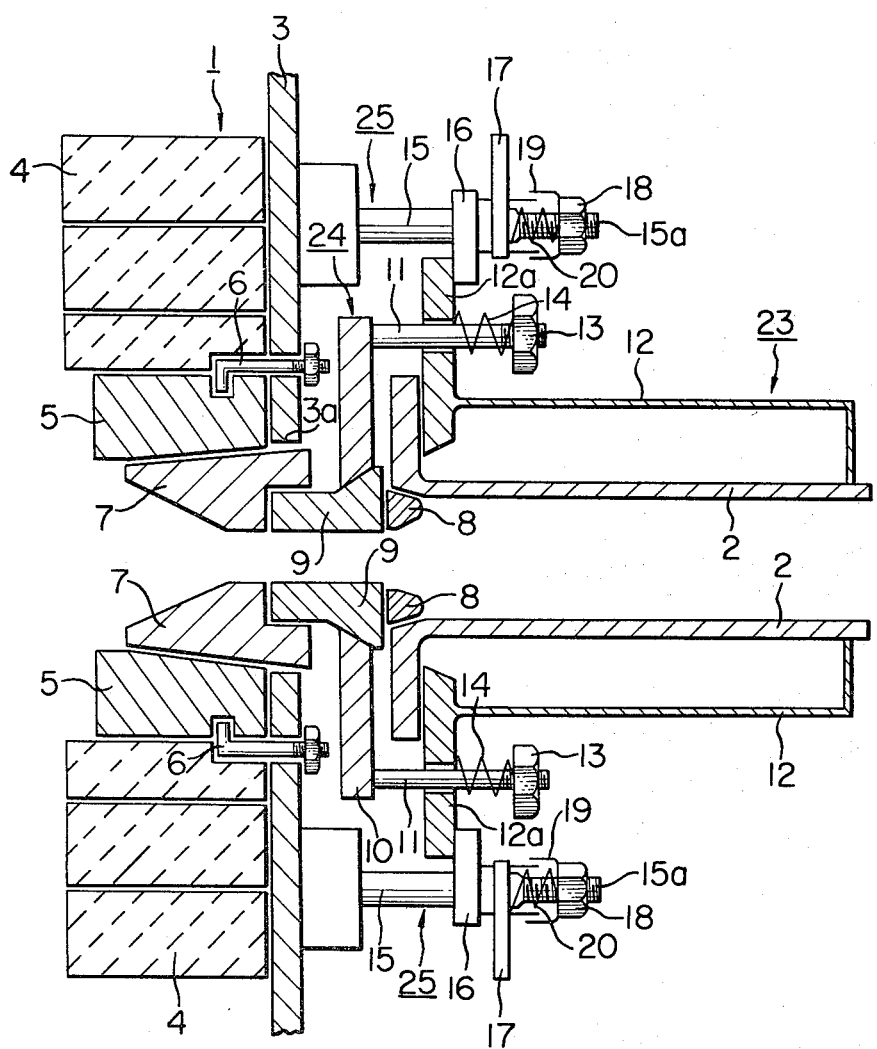
FIG. 2 is a sectional view illustrating an embodiment of the present invention; and, FIG. 3 is a sectional view illustrating another embodiment of the present invention.

FIG. 2 is a sectional view illustrating an embodiment of the present invention. In FIG. 2, 1 is a tundish side wall; and, 23 is a water-cooled mold. The tundish side wall 1 has a steel shell 3 and bricks 4 made of a refractory material arranged inside the stell sheel 3. The water-cooled mold 23 has a main mold body 2 and a mold jacket 12. The molten steel outlet portion of the tundish side wall 1 is constructed as follows. Namely, on the inner surface of the steel shell 3, a seating ring 5 is fitted to the periphery of a hole 3a which pierces through the steel shell 3 for pouring molten steel, and a front nozzle 7 having a concave portion for receiving a feed nozzle 9 is engaged with the seating ring 5 at the latter's inside through a joint material such as mortar. By piercing a plurality of clamping bolts 6 fixed to the seating rings 5 through the steel sheel 3, and then tightening these clamping bolts 6 by respective nuts, the seating ring 5 is fixed to the steel shell 3.

In FIG. 2, 8 is a break ring; and, 9 is a feed nozzle having an upset portion on the outside thereof. The break ring 8 is pushed against the inlet opening of the mold main body 2 through a joint material such as mortar, and one end of the feed nozzle 9 is pushed against the break ring 8 through a joint material such as mortar. More particularly, in FIG. 2, 24 is a holding member, which has a holding plate 10 and a plurality of plate supporting bolts 11. The holding plate 10 has a hole for receiving the upset portion of the outside of the feed nozzle 9, so that the feed nozzle 9 may not come off in the direction opposite to the cast strand extracting direction. The plate supporting bolts 11 are fixed at a plurality of points on the periphery of the holding plate 10, respectively. As shown in FIG. 2, a plurality of holes for inserting the plate supporting bolts 11 are pierced through a flange 12a located on the mold jacket 12 at the inlet end of the water-cooled mold. A nut 13 and a tightening mechanism having an elasticity means comprising a plurality of Belleville springs 14 are mounted on the plate supporting bolt 11 pierced through the flange 12a. As shown in FIG. 2, the holding plate 10 is pulled by the elastic force of the Belleville springs 14 toward the inlet side of the water-cooled mold 23, by piercing the plate supporting bolt 11 through the hole of the flange 12a of the mold jacket 12, engaging the Belleville spring 14 loosely onto the plate supporting bolt 11 from the top end thereof, driving in the nut 13 onto the plate supporting bolt 11 from the top end thereof, and tightening the nut 13. The break ring 8 is fitted to the opening of the main mold body 2 through a joint material, and the upset portion of the steel nozzle 9 is received in the hole of the holding plate 10 so as to not come off in the direction opposite to the cast strand extracting direction. As a result, the break ring 8 is pushed against the inlet opening of the main mold body 2 by the elastic force of the Belleville springs 14 through the holding plate 10 and the feed nozzle 9, and one end of the feed nozzle 9 is pushed against the break ring 8 by the elastic force of the Belleville springs 14 through the holding plate 10. Thus, the feed nozzle 9, the break ring 8 and the water-cooled mold 23 are integrally tightened together through the action of the holding member 24.

In FIG. 2, 25 is a connecting mechanism having a connecting rod 15 and a connecting lever 16. The connecting rod 15 is fitted to the outer surface of the steel shell 3 at a plurality of points around the molten metal outlet hole 3a. The axial direction of the connecting rod 15 agrees with the extracting direction of a cast strand. The connecting lever 16 is fitted to the connecting rod 15, movably in the axial direction of the connecting rod 15 and rotatably. The connecting lever 16 is integral with the maneuvering lever 17. As shown in FIG. 2, the threaded portion 15a of the connecting rod 15 is provided with a tightening nut 18. Further, the connecting rod 15 is equipped with an elasticity means comprising a plurality of Belleville springs 20 and a spring holding member 19 between the maneuvering lever 17 which is integral with the connecting lever 16 and the nut 18. The other end of the feed nozzle 9 is pushed against the front nozzle 7 through a joint material such as mortar as follows. As shown in FIG. 2, the connecting lever 16 is linked with the flange 12a of the mold jacket 12 by operating the maneuvering lever 17, and then the nut 18 is tightened. As a result, the tundish side wall 1 and the water-cooled mold 23 are tightened together by the elastic force of the Belleville springs 20, and thus, the other end of the feed nozzle 9 is pushed against the front nozzle 7 by the elastic force.

With reference to FIG. 2, the tundish side wall 1 and the water-cooled mold 23 are connected with each other by the above-mentioned connecting apparatus of the present invention as follows. First, the break ring 8 is fitted to the inlet opening of the main mold body 2 through a joint material. Separately, the front nozzle 7 is engaged into the seating ring 5 through a joint material. Then, the upset portion of the outside of the feed nozzle 9 is received in the hole of the holding plate 10, the plurality of plate supporting bolts 11 are inserted into the respective holes of the flange 12a, the Belleville springs 14 and the nut 13 are fitted to the plate supporting bolt 11, and the nut 13 is tightened. The holding plate 10 is drawn toward the inlet side of the water-cooled mold 23 by the elastic force of the Belleville springs 14. The break ring 8 is thus pushed against the inlet opening of the main mold body 2 through the joint material by the elastic force of the Belleville springs 14, and one end of the feed nozzle 9 is pushed against the break ring 8 through the joint material. Said end of the feed nozzle 9 is thus accurately and certainly positioned and brought into contact with the break ring 8 by the holding member 24 and the tightening mechanism comprising the elasticity means, and the feed nozzle 9 is held in contact with the break ring 8 until the tundish side wall 1 and the water-cooled mold 23 are connected with each other. It is therefore possible to conduct a connecting operation of the tundish side wall 1 and the water-cooled mold 23 very rapidly. Then, the other end of the feed nozzle 9 is received in the concave portion of the front nozzle 7 through the joint material, the connecting lever 16 is linked with the flange 12a, and the nut 18 is tightened. As a result, the tundish side wall 1 and the water-cooled mold 23 are tightened together. The other end of the feed nozzle 9 is thus pushed against the front nozzle 7 through the joint material by the elastic force of the Belleville spring 20. If viewed as a whole, as mentioned above, the elastic force of the Belleville springs 20 pushes the break ring 8 against the inlet opening of the mold main body 2, one end of the feed nozzle 9 against the break ring 8, and the other end of the feed nozzle 9 against the front nozzle 7, and thus, the tundish side wall 1 and the water-cooled mold 23 are connected with each other.

Figure 3:
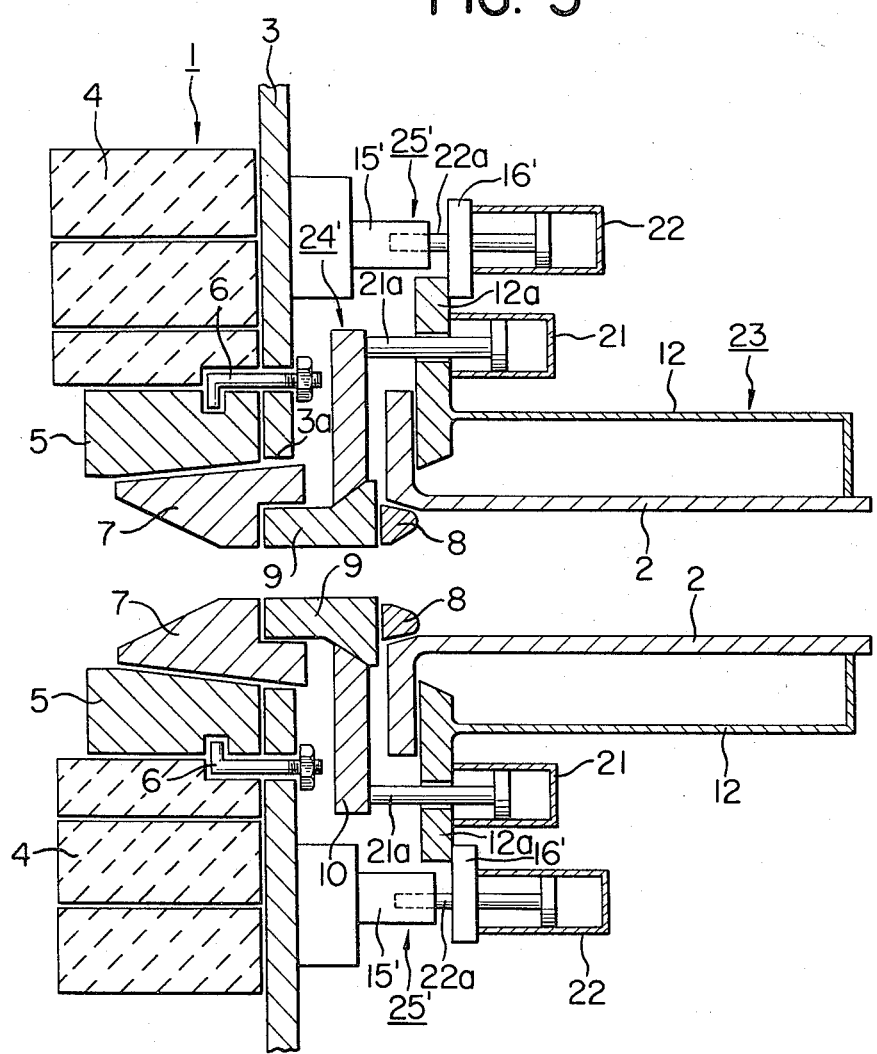

FIG. 3 is a sectional view illustrating another embodiment of the present invention. In FIG. 3, 1 is a tundish side wall; 23 is a water-cooled mold; 3 is a steel shell; 4 are bricks; 5 is a seating ring; 6 are a plurality of clamping bolts of the seating ring 5; 7 is a front nozzle; 8 is a break ring; and, 9 is a feed nozzle.

As shown in FIG. 3, a flange 12a of a mold jacket 12 is provided with a tightening mechanism having an elasticity means comprising a plurality of hydraulic cylinders. The rod 21a of the hydraulic cylinder 21 runs through a hole pierced in the flange 12a. The tip end of the rod 21a is fixed to a holding plate 10. In FIG. 3, 24' is a holding member having the holding plate 10 and a plurality of rods 21a. By operating the hydraulic cylinder 21, the holding plate 10 moves forward and backward relative to the inlet end of the water-cooled mold 23.

In FIG. 3, 25' is a connecting mechanism having a conncting rod 15' and a connecting lever 16'. The connecting rod 15' is fitted to the outer surface of the steel shell 3 at a plurality of points around the molten steel outlet hole 3a. The axial direction of the connecting rod 15' agrees with the extracting direction of a cast strand. As shown in FIG. 3, the connecting mechanism 25' is equipped with an elasticity means comprising a hydraulic cylinder 22 as follows. The main body of the hydraulic cylinder 22 is fixed to the connecting lever 16'. The rod 22a of the hydraulic cylinder 22 runs through the connecting lever 16', the tip end of which rod 22a is fixed to the connecting rod 15'. The axial direction of the rod 22a agrees with the extracting direction of a cast strand. The connecting lever 16' is rotatable relative to the rod 22a. By operating the hydraulic cylinder 22, the connecting lever 16' moves forward and backward relative to the steel shell 3. The connecting lever 16' is therefore releasable relative to the flange 12a.

With reference to FIG. 3, the tundish side wall 1 and the water-cooled mold 23 are connected to each other by the above-mentioned connecting apparatus of the present invention as follows. First, the break ring 8 is fitted to the inlet opening of the main mold body 2 through a joint material. Separately, the front nozzle 7 is engaged into the seating ring 5 through a joint material. Then, the upset portion of the outside of the feed nozzle 9 is received in the hole of the holding plate 10, and the holding plate 10 is drawn toward the inlet side of the water-cooled mold 23 by operating the hydraulic cylinder 21. One end of the feed nozzle 9 is thus pushed against the break ring 8 through a joint material by the elastic force of the hydraulic cylinder 21. Said end of the feed nozzle 9 is thus accurately and certainly positioned and brought into contact with the break ring 8 by the holding member 24' and the tightening means comprising the elasticity means, and the feed nozzle 9 is held in contact with the break ring 8 until the tundish side wall 1 and the water-cooled mold 23 are connected to each other. Then, the other end of the feed nozzle 9 is received in the concave portion of the front nozzle 7 through the joint material, the connecting lever 16' is linked with the flange 12a, and the connecting lever 16' is drawn toward the tundish side wall 1 by operating the hydraulic cylinder 22. As a result, the tundish side wall 1 and the water-cooled mold 23 are tightened together by the elastic force of the hydraulic cylinder 22. The other end of the feed nozzle 9 is thus pushed against the front nozzle 7 by the elastic force of the hydraulic cylinder 22. If viewed as a whole, as mentioned above, the elastic force of the hydraulic cylinder 22 pushes the break ring 8 against the inlet opening of the mold main body 2, one end of the feed nozzle 9 against the break ring 8, and the other end of the feed nozzle 9 against the front nozzle 7, and thus, the tundish side wall 1 and the water-cooled mold 23 are connected with each other.

According to the present invention, it is possible to push the break ring 8 against the inlet opening of the water-cooled mold 23, one end of the feed nozzle 9 against the break ring 8, and the other end of the feed nozzle 9 against the front nozzle 7, and hence to connect the tundish side wall 1 and the water-cooled mold 23 by an elastic force. It is therefore possible to prevent occurrence of cracks, breakage and molten metal leakage.

What is claimed is:

1. In an apparatus for connecting a tundish and a mold for horizontal continuous casting of a metal. a mold having an inlet opening and a tundish having a molten metal outlet on a side wall thereof, which comprises:
   a break ring fitted to the inlet opening of a mold through a joint material;
   a front nozzle engaged in the molten metal outlet of the side wall of a tundish;
   a feed nozzle provided between said break ring and said front nozzle so that one end thereof is in contact with said break ring and the other end thereof is in contact with said front nozzle through respective joint materials; and
   connecting means for connecting said tundish to said mold by tightening the side wall of said tundish to said mold;
   the improvement wherein said connecting means includes:
   a holding member;
   first elasticity means coupled to said holding member and to said mold for elastically pushing said break ring against the inlet opening of said mold and for elastically pushing one end of said feed nozzle against said break ring via said holding member; and second elasticity means coupled to said tundish and to said mold for elastically pushing the other end of said feed nozzle against said front nozzle; first tightening means for tightening said first elasticity means for increasing the elastic pushing force between said feed nozzle and said break ring; and second tightening means for tightening said second elasticity means for increasing the elastic pushing force between said feed nozzle and said front nozzle.

2. The apparatus as claimed in claim 1, wherein said first and second elasticity means comprise at least one spring.

3. The apparatus as claimed in claim 1, wherein said first and second elasticity means comprise at least one hydraulic cylinder.

* * * * *